United States Patent Office 3,708,475
Patented Jan. 2, 1973

3,708,475
PROCESS FOR THE PRODUCTION OF CHLORINE-CONTAINING v-TRIAZOLE COMPOUNDS
Rudolf Kirchmayr, Binningen, Basel-Land, Switzerland, assignor to Ciba-Geigy Corporation, Ardsley, N.Y.
No Drawing. Filed June 3, 1970, Ser. No. 43,209
Int. Cl. C07d 55/02
U.S. Cl. 260—240 C
2 Claims

ABSTRACT OF THE DISCLOSURE 2,4-disubstituted -5-chloro-v-triazoles are produced by reacting a 2,4-disubstituted-v-triazole-1-oxide with sulphuryl chloride and reducing the 2,4-disubstituted-5-chloro-v-triazole-1-oxide obtained with nascent hydrogen. The v-triazoles are brighteners for high-molecular organic materials.

DESCRIPTION OF INVENTION

The present invention relates to a process for the production of v-triazole compounds containing in the 4- or 5-position of the triazole ring a chlorine atom.

v-Triazole compounds containing a halogen atom as substituent on the triazole ring have been mentioned in patents as being a possibility, but they have never been more closely defined or described. The reason for this is probably that such compounds are difficultly accessible using known methods of synthesis, and very expensive to produce since their production embraces several stages. They are produced, for example, by commencing with a v-triazole compound containing in the 4- or 5-position a nitro group, reducing this nitro group to an amino group, diazotising it and subjecting it to a Sandmeyer's reaction, or by starting with a 1,2,4-oxadiazole of the formula

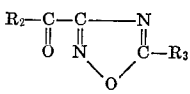

which is reacted with a hydrazine of the formula $H_2N$—NH—$R_1$, whereupon the obtained v-triazole compound of the formula

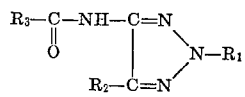

is saponified to the amine, the amino group diazotised and replaced according to Sandmeyer by a halogen. It is also probable that these methods do not in all cases lead to the attainment of the desired product, so that there is a need for a better general method of production, for the products of the process constitute important intermediate products for valuable compounds or, if the starting materials are correspondingly substituted, they constitute already valuable final products. In particular, the products exhibit with the presence of a fluorescent group a good optical brightening effect. The chlorine atom on the v-triazole ring is slow to react, so that where the compounds are used as optical brighteners, e.g. in spinning solutions, there are no disturbing secondary reactions.

Surprisingly, it has now been found that it is possible to obtain, in a simple manner, the desired chlorine-containing v-triazoles of the Formula I

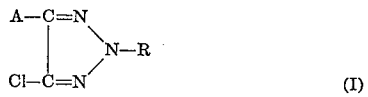

wherein

R represents an organic radical, especially a carbo- or heterocyclic radical, which is bound by means of a carbon atom to the nitrogen of the v-triazole ring, and A represents an alkyl, alkenyl, aralkyl, aralkenyl or aryl group, or an heterocyclic radical of aromatic character, by reacting a v-triazole oxide of the Formula II,

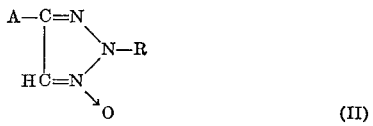

firstly with sulphuryl chloride, preferably in chlorated hydrogen carbons as solvent such as chlorobenzene, tetrachloroethane, dichlorobenzene, trichloroethane etc. to the corresponding compound containing chlorine in the 5-position, and then reducing this with nascent hydrogen, e.g. by means of zinc dust and glacial acetic acid, to a compound of the Formula I.

The starting materials for the process according to the invention, the v-triazole-1-oxides, can be obtained from compounds of the Formula IIa,

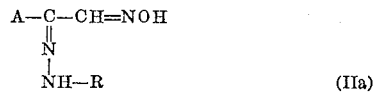

by oxidative ring closure.

The oxidative ring closure can be produced by the action of the most diverse oxidising agents; it is advisable in this connection to operate in solvents resistant to oxidation. In acid, e.g. acetic acid solution, bichromate or hydrogen peroxide are suitable oxidising agents; in basic solvents, such as pyridine or pyridine/water mixtures, a suitable oxidising agent is, for example, potassium ferricyanide. The generally applicable and therefore preferred process is oxidation with copper-(II)-sulphate in pyridine/water. It is not necessary thereby to use stoichiometric amounts of copper, because the monovalent copper formed during the reaction can be continually converted during the reaction, by the blowing in of air or oxygen, again into the bivalent stage.

The compounds of the Formula IIa can be produced by reaction of compounds of the formula

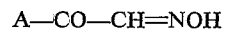

with R—NH—$NH_2$.

Particularly interesting compounds, which are obtained by the new process, are those having a fluorescent group, which can therefore serve as optical brighteners. Suitable fluorescent groups are, in particular, substituted coumarinyl or stilbyl groups.

Optical brighteners of the Formula I, wherein R represents a coumarinyl group of the Formula III,

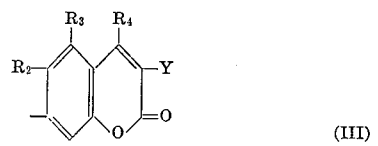

wherein

Y stands for a mononuclear carbo- or heterocyclic aryl group which is in conjugation with the coumarin ring, and $R_1$, $R_2$, $R_3$ and $R_4$ stand for hydrogen or a lower alkyl group are obtained by reaction of the corresponding substituted v-triazole oxide of the Formula II with $SO_2Cl_2$ and subsequent reduction with nascent hydrogen. Lower alkyl groups are such groups containing 1–6, especially 1–4, carbon atoms.

In the same manner are produced optical brighteners of the Formula I, wherein R represents a stilbyl group of the Formula IV,

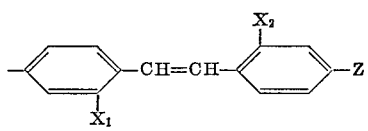

(IV)

wherein $X_1$ and $X_2$ stand for hydrogen, the sulphonic acid, carboxylic acid or sulphoneamide radical, a sulphoester, carboxamide, carboxy ester, alkylsulphone or arylsulphone radical, or the cyano group, and Z stands for hydrogen, halogen, the cyano group, an acylated amino group or an optionally substituted v-triazolyl, pyrazolyl or triazinyl group.

These coumarin and stilbene derivatives, which are distinguished by good compatibility with high-molecular, hydrophobic, organic substances, are suitable for the brightening of such materials which can be obtained, e.g. by polymerisation or polycondensation, such as polyolefins, e.g. polyethylene or polypropylene, also polyvinyl chloride, but particularly polyesters, especially polyesters of aromatic polycarboxylic acids with polyvalent alcohols, such as polyterephthalic acid glycol ester, synthetic polyamides such as nylon-6 and nylon-66, but also cellulose esters such as cellulose acetates.

The optical brightening of the high-molecular, hydrophobic, colourless, organic material is performed, for example, by incorporating into this material small amounts of optical brighteners obtained according to the invention, preferably 0.001 to 1% relative to the material to be brightened, optionally together with other substances such as softeners, stabilisers or pigments. The brighteners can be worked into the synthetic materials, e.g. dissolved in softeners such as dioctylphthalate, or together with stabilisers such as dibutyl tin dilaurate or sodium pentaoctyl tripolyphosphate, or together with pigments such as, e.g. titanium diozide. Depending on the type of material to be brightened, the brightener can also be dissolved in the monomers before polymerisation, in the polymer mass, or together with the polymers in a solvent. The thus pretreated material is afterwards processed into the desired final form by methods known per se, such as calendering, pressing, extrusion, coating, moulding and, in particular, by spinning and stretching. The brighteners can also be worked into finishings, e.g. into finishings for textile fibres such as polyvinyl alcohol, or into resins or resin pre-condensates such as, e.g. methylol compounds of ethylene urea, which are used for the treatment of textiles.

Colourles, high-molecular, organic material is likewise brightened in the form of fibres. These fibre materials are brightened by using advantageously an aqueous dispersion or solution of v-triazoles of the Formula I produced according to the invention. The brightener preparation preferably has a content of 0.005–0.5% of v-triazole according to the invention, relative to the fibre material. In addition, the dispersion can contain auxiliaries such as dispersing agents, e.g. condensation products of fatty alcohols or alkyl phenols containing 10 to 18 carbon atoms, with 15 to 25 moles of ethylene oxide, or condensation products of alkylmono- or polyamines containing 16 to 18 carbon atoms, with at least 10 moles of ethylene oxide, organic acids such as formic, oxalic or acetic acid, detergents, swelling agents such as di- or trichlorobenzenes, wetting agents such as sulphosuccinic acid alkyl ester, bleaching agents such as sodium chlorite, peroxides or hydrosulphites, as well as, optionally, brightening agents of other classes such as, e.g. derivatives of stilbene having affinity to cellulose.

The brightening of the fibre material with the aqueous brightener preparation is performed either by the exhaust process, at temperatures of preferably 30 to 150° C., or by the padding process. In the latter case, the material is impregnated with a, for example, 0.2–0.5% brightener dispersion and finished, e.g. by a dry or moist heat treatment, e.g. by steaming at 2 atmospheres pressure or, after a drying treatment, by a short dry heating to 180–200°, whereby, optionally, the fabric is simultaneously thermofixed. The fibre material treated in this manner is finally rinsed and dried.

Colourles, high-molecular, organic material optically brightened in the described manner, especially the synthetic fibre material brightened by the exhaust process, has a pleasing, pure white, blue-violet to bluish fluorescent appearance; such material dyed in light shades and brightened according to the invention is distinguished by a pure shade.

The v-triazoles obtained according to the invention can also be added to detergents. Such detergents containing v-triazoles can also be used for the brightening of textiles. They can contain the usual fillers and auxiliaries, e.g. alkali-poly- and polymetaphosphates, alkali silicate, alkali borates, alkali salts or carboxymethyl celluloses, foam stabilisers such as alkanolamides of higher fatty acids, or complexones such as soluble salts of ethylenediaminetetraacetic acid, as well as chemical bleaching agents such as perborates or percarbonates.

The new v-triazoles are worked into the detergents or into washing liquors in the form of solutions of the v-triazoles in neutral, water-miscible and/or readily volatile, organic solvents such as lower alkanols, lower alkoxyalkanols or lower aliphatic ketones. They can also be used, however, in a finely dispersed solid form either alone or in admixture with dispersing agents. They can be, for example, mixed, kneaded or milled with the washing-active substances and the usual auxiliaries and fillers can then be added. For example, the brightening agents are mixed with the washing-active substances, usual auxiliaries and fillers and water to form a slurry and this is then sprayed in the spray dryer. The new v-triazole derivatives can also be added to finished detergents, e.g. by the spraying of a solution in a readily volatile and/or water-soluble organic solvent onto the dry moving detergents.

The content in the detergents of optical brightener is advantageously 0.001–0.5%, relative to the solid content of the detergent. Such detergents containing an optical brightener can posses, compared with detergents containing no brightener, a greatly improved white appearance in daylight.

Washing liquors containing the optical brighteners according to the invention impart, during washing, to the textile fibres treated therewith, e.g. synthetic polyamide, polyester, polyolefin and cellulose ester fibres, a brilliant appearance in daylight. They can be used therefore, in particular, for the washing of these synthetic fibres, or of textiles or component parts of textiles, or linen goods. For use in the household washing, they can also contain further optical brighteners having affinity to other fibres, e.g. to cellulose.

In the following examples, the temperatures are given in degrees centigrade.

EXAMPLE 1

1.1. 2-[3-phenylcoumarinyl-(7)]-4-phenyl-5-chloro-v-triazole 38.2 g. of 2 - [3 - phenylcoumarinyl-(7)]-4-phenyl-v-triazole-1-oxide are heated in 500 ml. of anhydrous tetrachloroethane to 80°. At this temperature and over a period of 1 hour, 15.0 g. of sulphuryl chloride are added dropwise, and this reaction mixture is stirred for a further 12 hours at 80–90°. The obtained dark brown solution is filtered, and to the filtrate are added 600 ml. of ligroin. A crystalline precipitate occurs in the cold state. The thus obtained 2 - [3-phenylcoumarinyl-(7)]-4-phenyl-5-chloro-v-triazole-1-oxide melts after recrystallisation from chlorobenzene, using decolourising carbon, at 258°.

20.8 g. of the thus obtained 2-[3-phenylcoumarinyl-(7)]-4-phenyl-5-chloro-v-triazole-1-oxide are refluxed with 10.0 g. of zinc dust in 200 ml. of glacial acetic acid for 6 hours. The reaction mixture is filtered hot. In the cold state in the filtrate, light yellow crystals precipitate, M.P. 195°, which readily dissolve in chlorobenzene with an intense blue-violet fluorescence.

If, instead of 2-[3-phenylcoumarinyl-(7)]-4-phenyl-v-triazole-1-oxide, the following triazole oxides are reacted according to the above described procedure, then the following v-triazoles are obtained:

From 2 - [3 - (4-methylphenyl)coumarinyl-(7)]-4-phenyl-v-triazole-1-oxide:

1.2. 2 - [3-(4-methylphenyl)coumarinyl-(7)]-4-phenyl-5-chloro-v-triazole, M.P. 241–242°.

From 2 - [3 - (3-chlorophenyl)-coumarinyl-(7)]-4-phenyl-v-triazole-1-oxide:

1.3. 2 - [3-(3-chlorophenyl)-coumarinyl-(7)-]-4-phenyl-5-chloro-v-triazole.

From 2 - [3 - (3-methoxyphenyl-coumarinyl-(7)]-4-phenyl-v-triazole-1-oxide:

1.4. 2 - [3-(3-methoxyphenyl)-coumarinyl-(7)]-4-phenyl-5-chloro-v-triazole.

From 2 - [3 - (2-chlorophenyl)-coumarinyl-(7)[-4-phenyl-v-triazole-1-oxide:

1.5. 2 - [3-(2-chlorophenyl)-coumarinyl-(7)]-4-phenyl-5-chloro-v-triazole, M.P. 219–220°.

From 2 - [3 - (4-chlorophenyl)-coumarinyl-(7)]-4-phenyl-v-triazole-1-oxide:

1.6. 2 - [3 - (4-chlorophenyl)-coumarinyl-(7)]-4-phenyl-5-chloro-v-triazole, M.P. 252°.

The brighteners obtained according to this example impart to polyester, polyamide and polypropylene fabrics, using the exhaust or padding process, a brilliant white appearance; also when they are added to the monomeric starting constituents for the production of polyesters or to a polyester spinning bath, brilliant white threads are obtained after spinning. They can also be added, with a good degree of success, to washing baths for textiles, especially polyester and polyamide fibres, and to finishing liquors for fibre mixtures.

The phenylcoumarinyl triazole oxides used in this example and in the Examples 2, 3 and 6 can be produced by known methods, e.g. by the process described in the Belgian Pat. No. 710,868.

EXAMPLE 2

2.1. 2-[3-phenylcoumarinyl-(7)]-4-methyl-5-chloro-v-triazole 32.0 g. of 2-[3-phenylcoumarinyl-(7)]-4-methyl-v-triazole-1-oxide are heated in 500 ml. of anhydrous tetrachloroethane to 80°. At this temperature, 16.2 g. of sulphuryl chloride are added dropwise during one hour. The reaction mixture is thereafter stirred for 10 hours at 80–90°. The obtained solution is filtered hot, and in the filtrate, by the addition of ligroin, 2-[3-phenylcoumarinyl-(7)]-4-methyl-5-chloro-v-triazole-1-oxide is precipitated.

25.0 g. of the above obtained chlorotriazole oxide are refluxed with 5.0 g. of zinc dust in 500 ml. of glacial acetic acid for 5 hours. The reaction mixture is filtered hot, and in the filtrate, during cooling, 2-[3-phenyl-coumarinyl-(7)]-4-methyl-5-chloro-v - triazole crystallises out in the form of light yellow crystals, which dissolve in chlorobenzene with a blue -violet fluoroscence, M.P. 249–250°.

If, instead of 2-[3-phenylcoumarinyl-(7)]-4-methyl-v-triazol - 1-oxide, 2-[3-phenylcoumarinyl-(7)]-4-n-butyl-v-triazole-1-oxide is reacted as described above with SO₂Cl₂, and subsequently reduced, then the following is obtained:

2.2. 2 - [3 - phenylcoumarinyl-(7)]-4-n-butyl-5-chloro-v-triazole.

From 2 - [3 - phenylcoumarinyl-(7)]-4-ethyl-v-triazole-1-oxide is obtained in the same manner:

2.3. 2 - [3 - phenylcoumarinyl-(7)]-4-ethyl-5-chloro-v-triazole.

From 2 - [3 - phenylcoumarinyl-(7)]-4-benzyl-v-triazole-1-oxide is obtained:

2.4. 2 - [3 - phenylcoumarinyl-(7)]-4-benzyl-5-chloro-v-triazole.

These brighteners too are used, in particular, for the brightening of textile material made from polyesters and from nylon by the exhaust process or the padding process. Furthermore, they can be added to polyester spinning solutions and also used in the production of polyesters.

EXAMPLE 3

3.1. 2-[3-phenylcoumarinyl-(7)]-4-(4-methylphenyl)-5-chloro-v-triazole 39.6 g. of 2-[3-phenylcoumarinyl-(7)]-4-(4-methylphenyl)-v-triazole-1-oxide are heated in 400 ml. of anhydrous tetrachloroethane to 80°. At this temperature, 16.2 g. of sulphuryl chloride are added dropwise during 1 hour. Stirring is maintained thereafter for 12 hours at 80–90°. The obtained brownish coloured solution is filtered hot. In the filtrate precipitates in crystalline form, by the addition of ligroin, 2-[3-phenylcoumarinyl-(7)]-4-(4-methylphenyl)-5-chloro-v-triazole-1-oxide.

20.2 g. of this compound are refluxed with 5.0 g. of zinc dust in 400 ml. of glacial acetic acid for 5 hours. The reaction mixture is afterwards filtered hot. On cooling, 2 - [3 - phenylcoumarinyl-(7)]-4-(methylphenyl)-5-chloro-v-triazole crystallises out. This melts at 216° after a recrystallisation from toluene.

If, instead of 2-[3-phenylcoumarinyl-(7)]-4-(4-methylphenyl)-v-triazole-1-oxide, the following triazole oxides are reacted in an analogous manner to that described above, then the following v-triazoles are obtained:

From 2-[3-phenylcoumarinyl-(7)]-4-(4-chlorophenyl)-v-triazole-1-oxide:

3.2. 2 - [3-phenylcoumarinyl-(7)]-4-(4-chlorophenyl)-5-chloro-v-triazole, M.P. 229–230°.

From 2 - [3 - phenylcoumarinyl-(7)]-4-(4-methoxyphenyl)-v-triazole-1-oxide:

3.3. 2 - [3-phenylcoumarinyl-(7)]-4-(4-methoxyphenyl)-5-chloro-v-triazole, M.P. 197–198°.

From 2 - [3-phenylcoumarinyl-(7)]-4-(2-naphthyl)-v-triazole-1-oxide:

3.4. 2 - [3 - phenylcoumarinyl-(7)]-4-(2-nyphthyl)-5-chloro-v-triazole, M.P. 236–237°.

From 2-[3-phenylcoumarinyl-(7)]-4-(4-phenylphenyl)-5-chloro-v-triazole:

3.5. 2 - [3-phenylcoumarinyl-(7)]-4-(4-phenylphenyl)-5-chloro-v-triazole, M.P. 205°.

From 2 - [3 - phenylcoumarinyl-(7)]-4-(3,4-dimethylphenyl)-5-chloro-v-triazole-1-oxide:

3.6. 2-[3-phenylcoumarinyl-(7)]-4-(3,4-dimethylphenyl)-5-chloro-v-triazole.

From 2 - [3-phenylcoumarinyl-(7)]-4-(thienyl-(2))-v-triazole-1-oxide:

3.7. 2-[3-phenylcoumarinyl-(7)]-4-thienyl-(2))-5-chloro-v-triazole.

These compounds are used for the optical brightening of various textile fibres, particularly those made from polyesters, polyamides or polypropylene. The compounds can be applied to the textile material by the exhaust process or by the padding process. They can also be contained in a detergent for textile fibres. Also the addition of the compounds to a spinning solution prepared from polyester or polypropylene leads to greatly brightened fibres.

EXAMPLE 4

4.1. 4,4'-bis-[4-phenyl-5-chlorotriazolyl-(2)]-stilbene-2,2'-disulphonic acid phenyl ester 4.2 g. of 4,4'-bis-[4-phenyltriazolyl-(2)-1-oxide]-stilbene-2,2'-disulphonic acid phenyl ester are stirred with 2.5 g. of sulphuryl chloride in 100 ml. of tetrachloroethane for 24 hours at 80–90°. In this manner is obtained 4,4' - bis - [4-phenyl-5-chlorotriazolyl-(2)-1-oxide]-stilbene-2,2'-disulphonic acid phenyl ester. This is reduced, by boiling for 4 hours in glacial acetic acid with 2.0 g. of zinc dust, to 4,4'-bis-[4-phenyl-5-chlorotriazolyl-(2)-]-stilbene-2,2'-disulphonic acid diphenyl ester.

This compound is able to optically brighten synthetic textile fibres such as polyester or polypropylene fibres, by application of the usual processes.

4.2. 4,4'-bis-[4 - phenyl-5-chlorotriazolyl-(2)]-stilbene-2,2'-disulphonic acid: The ester 4.1 is saponified with potassium hydroxide in methanol to the potassium salt of 4,4' - bis - [4-phenyl-5-chlorotriazolyl-(2)]-stilbene-2,2'-disulphonic acid, which is obtained in the form of a light yellow powder.

The compound is able to greatly brighten, e.g. cotton or polyamide fibres, whereby it can be applied to the fibres by the exhaust process, e.g. in a washing bath or in a bleaching liquor.

EXAMPLE 5

5.1. 4,4'-bis-4-methyl-5-chlorotriazolyl-(2)-stilbene-2,2'-disulphonic acid phenyl ester This compound is obtained, applying the procedure described in Example 4, from 4,4'-bis-[4-methyltriazolyl-(2)-1-oxide]-stilbene-2,2'-disulphonic acid phenyl ester. The compound is able to optically brighten textile material made from synthetic fibres such as polyester and polypropylene fibres, when it is applied to the fibres by the usual methods.

5.2. 4,4'-bis-[4-methyl-5-chlorotriazolyl-(2)-]stilbene-2,2'-disulphonic acid

By saponification of the ester 5.1 in the manner described in Example 4, the potassium salt of 4,4'-bis-[4-methyl - 5 - chlorotriazolyl-(2)]-stilbene-2,2'-disulphonic acid is obtained in the form of a light yellow powder.

This compound too is suitable for the optical brightening of cotton or polyamide fibres, the compound being applied to the fibres by the usual processes.

EXAMPLE 6

2-(2-methoxy-5-chlorophenyl)-4-phenyl-5-chloro-v-triazole 30.2 g. of 2-(2-methoxy-5-chlorophenyl)-4-phenyl-v-triazole-1-oxide are heated in 100 ml. of anhydrous tetrachloroethane to 90°. 25.0 g. of sulphuryl chloride are added dropwise at this temperature within 1 hour, and stirring is maintained for a further 8 hours at 80–90°. The solution is evaporated to dryness and the residue recrystallised from alcohol. In this manner is obtained 2-(2-methoxy - 5-chlorophenyl)-4-phenyl-5-chloro-v-triazole-1-oxide, M.P. 144°.

10.0 g. of the above obtained chlorotriazole oxide are refluxed in 100 ml. of glacial acetic acid with 5.0 g. of zinc dust for 4 hours. Filtering is then carried out and the filtrate diluted with water. A white crystalline precipitate thereby occurs. After a recrystallisation from alcohol, the thus obtained 2-(2-methoxy-5-chlorophenyl)-4-phenyl-5-chloro-v-triazole melts at 81°.

EXAMPLE 7

To 100 ml. of water are added as carrier 0.2 g. of trichlorobenzene, and a solution of 0.003 g. of the triazole derivative described in Example 1.1 in 3 ml. of ethylene glycol monomethyl ether is added. The thus obtained liquor is heated to 60°, and into it are then placed 3 g. of a polyester fabric. The temperature is raised during 10–15 minutes to 95–98° and this temperature is maintained for 1 hour. The fabric is thereupon rinsed and dried. The thus treated fabric possesses a white, brilliant appearance.

If, instead of the brightener stated in the above example, the v-triazoles described in the Examples 2.1, 3.2, 3.1, 3.3, 3.4 and 3.5 are used, with the same procedure as in the above example, then similar results are obtained.

In this and in the following Examples 8, 9 and 24, "trichlorobenzene as carrier" signifies a mixture of 76 parts by weight of 1,2,4-trichlorobenzene and 27 parts by weight of a mixture suitable as emulsifier for the preparation of aqueous emulsions.

EXAMPLE 8

To 100 ml. of water are added 0.2 g. of sodium chlorite, 0.2 g. of sodium nitrate and 0.2 g. of oxalic acid and 3 ml. of a stock solution of the brightener produced in Example 2.1. The stock solution is prepared by dissolving 1 g. of the stated brightener in 1000 ml. of ethylene glycol monomethyl ether. To this aqueous solution are additionally added, as a carrier, 0.2 g. of trichlorobenzene. This liquor is heated to 60°, and 3 g. of a polyester fabric are then introduced; the temperature is raised within 10–15 minutes to 85°, and the bath is allowed to stand for 30 minutes at this temperature. The temperature is subsequently raised to 98–100°, and the polyester fabric is treated at the temperature for a further 30 minutes. The fabric is thereupon rinsed and dried. The thus treated fabric has a white, brilliant appearance.

By proceeding as described in this example but using, instead of the stated brightener, the chlorinated triazoles according to Examples 1.1, 3.1, 3.5, a clearly brightened fabric is likewise obtained.

EXAMPLE 9

To 285 ml. of water are added 0.3 g. of alkylpolyglycol ether and 0.15 g. of trichlorobenzene as a carrier. A solution is prepared of the optical brightener according to Example 3.1 by dissolving 1 g. thereof in 1000 ml. of ethylene glycol monoethyl ether.

15 ml. of this stock solution are added to the above described solution. The liquor is heated to 20–30°, and 15 g. of polyester fabric are introduced into the solution. The temperature is raised within 30 minutes to 130° and this temperature is maintained for 30 minutes. The whole is then cooled in the course of 15–20 minutes to 60°. The fabric is rinsed and dried and afterwards thermofixed for 30 seconds at 200° with hot air. The thus treated fabric has a white, brilliant appearance.

Similar results are obtained by proceeding as described above but using the brighteners given in Examples 2.1, 1.1, 3.2, 3.3, 3.4 and 3.5.

EXAMPLE 10

To 100 ml. of water are added 0.2 g. of di-n-octyl sodium sulphosuccinate. A 10% sand milling is produced of the optical brightener according to Example 1.1. 3 g. of this sand milling are added to the above described aqueous solution. A polyester fabric is padded with this solution (20°) (squeezing effect 50–60%, roller pressure 30 kg./cm.², speed 3 m./minute). The fabric is dried at ca. 60°, and the dried fabric fixed for 30 seconds at 200°. The thus treated fabric possesses a white, brilliant appearance.

Similar results are obtained with the brighteners according to Examples 2.1, 3.2, 3.3, 3.4 and 3.5.

EXAMPLE 11

To 100 ml. of water are added 0.4 g. of the detergent of the following composition:

| | Percent |
|---|---|
| Dodecylbenzene sulphonate | 16 |
| Fatty alcohol sulphonate | 4 |
| Na-tripolyphosphate | 35 |
| Tetra sodium phosphate | 7 |
| Magnesium silicate | 2 |
| Sodium disilicate | 7 |
| Carboxymethyl cellulose | 1 |
| Sodium sulphate | 25.5 |
| Water | 2.5 |

1.0 g. of the optical brightener obtainable according to Example 1.1 is dissolved in 1000 ml. of ethylene glycol monoethyl ether. 0.8 ml. of this stock soution are added to the above described aqueous solution. The thus obtained washing liquor is heated to 55–60° and 3 g. of a polyester fabric are introduced. Washing proceeds at this temperature for 20 minutes. The fabric is rinsed and dried. The washed sections of fabric possess after the treatment a brilliant, white appearance. Similar results are obtained by proceeding as described above but using, instead of the above brightener, the brightener described in Example 3.5.

EXAMPLE 12

To 100 ml. of water are added 0.06 g. of an alkylpolyglycol ether. A solution is prepared of the optical brightener according to Example 2.1 by dissolving 1.0 g. thereof in 1000 ml. of dimethylformamide. 1.5 ml. of this stock solution are added to the above described aqueous solution. This liquor is heated to 60°, and 3 g. of nylon staple fabric are then introduced into this solution. The temperature is raised within 10–15 minutes to 90–92° and this temperature is maintained for 30 minutes. The fabric is rinsed and dried. The thus treated fabric has a white and brilliant appearance.

Similar results are obtained with the brighteners according to Examples 1.1, 3.1, 3.2, 3.4, 3.5, 4 and 5, using the same method of application.

EXAMPLE 13

To 100 ml. of water are added 0.12 ml. of 85% formic acid and 0.06 g. of alkylpolyglycol ether. A solution is prepared of the optical brightener according to Example 3.1 by dissolving 1 g. thereof in 100 ml. of dimethylformamide. 1.5 ml. of the stock solution are added to the above described aqueous solution. This solution containing the brightener is heated to 60°, and 3 g. of nylon staple fabric are introduced into this liquor. The tempreature is raised within 10 minutes to 90–92° and this temperature is maintained for 30 minutes. The fabric is then rinsed and dried. The thus treated fabric possesses a white and brilliant appearance.

Similar results are obtained, using the same method of application as given above, with the brighteners described in Examples 2.1, 1.1, 3.2, 3.3, 3.4, 3.5, 4 and 5.

EXAMPLE 14

To 100 ml. of water are added 0.4 g. of detergent as in Example 11. A solution is prepared of the optical brightener according to Example 1.1 by dissolving 1 g. thereof in 1000 ml. of ethylene glycol monomethyl ether. 1 ml. of this stock solution is added to the above described liquor. This is then heated to 60° and 3 g. of polyamide fabric are introduced into the solution. This temperature is maintained for 20 minutes. After being rinsed and dried, the fabric has a brilliant white appearance.

Similar results are obtained with the same procedure but using the brighteners described in Examples 3.1, 3.3, 3.7, 4 and 5.

EXAMPLE 15

To 100 ml. of water are added 0.6 ml. of 8% acetic acid and 0.06 g. of alkylpolyglycol ether. A solution is prepared of the optical brightener according to Example 1.1 by dissolving 1 g. thereof in 1000 ml. of dimethylformamide. 6 ml. of this stock solution are added to the above described aqueous solution. This liquor is heated to 40°, and 3 g. of polypropylene fabric ("Meraklon") are introduced into this solution. The temperature is raised within 10–15 minutes to 95–98° and this temperature is maintained for 30 minutes. The fabric is rinsed and dried.

The thus treated fabric has a white and brilliant appearance.

EXAMPLE 16

To 100 ml. of water are added 0.6 ml. of 8% acetic acid and 0.06 g. of alkylpolyglycol ether. A solution is prepared of the optical brightener according to Example 3.7 by dissolving 1 g. thereof in 1000 ml. of diethylformamide. 6 ml. of this stock solution are added to the above described aqueous solution. This solution containing the optical brightener is heated to 60°, and 3 g. of triacetate twill fabric are then introduced into the solution. The temperature is raised within 10–15 minutes to 95–98° and this temperature is maintained for 30 minutes. The fabric is rinsed and dried. The thus treated fabric possesses a brilliant white appearance.

EXAMPLE 17

To 100 ml. of water are added 0.6 ml. of 8% acetic acid and 0.06 g. of alkylpolyglycol ether. A solution is prepared of this optical brightener according to Example 3.7 by dissolving 1 g. thereof in 1000 ml. of dimethylformamide. 6 ml. of this stock solution are added to the above described aqueous solution. This aqueous solution containing the brightener is heated to 40°, and 3 g. of acetate satin fabric are then introduced into the solution. The temperature is raised within 10–15 minutes to 75° and this temperature is maintained for 30 minutes. The fabric is rinsed and dried. The thus treated fabric possesses a brilliant white appearance.

EXAMPLE 18

To 100 ml. of water are added 0.2 g. of sodium sulphate and 0.06 g. of alkylpolyglycol ether. 1 g. of the optical brightener according to Example 4 is dissolved in 1000 ml. of water. 2 ml. of this stock solution are added to the above described solution. This aqueous solution containing the brightener is heated to 40–45°, and 3 g. of cotton fabric are then introduced into the solution. This temperature is maintained for 30 minutes. The fabric is thereupon rinsed and dried.

The thus treated fabric possesses a white brilliant appearance.

Similar results are obtained with the brightener according to Example 5, using the same method of application.

EXAMPLE 19

To 100 ml. of water are added 0.4 g. of detergent of the same composition as described in Example 11. (Instead of sodium sulphate, the detergent can also contain 10–20% of Na-perborate or another agent releasing oxygen.)

A solution is prepared of the optical brightener according to Example 5 by dissolving 1 g. thereof in 1000 ml. of water. 2 ml. of this stock solution are added to the above described liquor. This aqueous solution containing the brightener is heated to 92°, and 3 g. of cotton fabric are introduced into the solution. This temperature is maintained for 30 minutes; the fabric is then rinsed and dried. The thus treated fabric possesses a white brilliant appearance.

With the same application as described above, similar results are obtained using the brightener according to Example 4.

EXAMPLE 20

To 100 ml. of water are added 0.2 g. of Na-chlorite, 0.2 g. of Na-nitrate and 0.2 g. of oxalic acid, or an equivalent amount of another organic or inorganic acid suitable for this purpose.

A solution is prepared of the optical brightener described in Example 4 by dissolving 1 g. thereof in 1000 ml. of water. 2 ml. of this stock solution are added to the above described solution. This aqueous solution containing the brightener is heated to 40°, and 3 g. of desized, unbleached cotton fabric are introduced into the solution. The temperature is raised within 15–20 minutes to 85° and this temperature is maintained for 60 minutes. The fabric is rinsed and dried.

The thus treated fabric has a white brilliant appearance.

EXAMPLE 21

To 100 ml. of water are added 0.1 g. of Na-chlorite, 0.1 g. of Na-nitrate and 0.1 g. of oxalic acid, or an equivalent amount of another organic or inorganic acid suitable for this purpose. A solution is prepared of the optical brightener according to Example 4 by dissolving 1 g. thereof in 1000 ml. of water free from salt. 2 ml. of this stock solution are added to the above described solution. This aqueous solution containing the brightener is heated to 40°, and 3 g. of polyamide fabric are introduced into the solution. The temperature is raised within 15–20 minutes to 85°, and this temperature is maintained for 60 minutes. The fabric is rinsed and dried. The thus treated fabric possesses a white brilliant appearance.

EXAMPLE 22

An aqueous solution of the following composition is prepared:

150 g./l. of a reactant resin based on dimethylolethylene resin,
15 g./l. of $MgCl_2 \cdot 6H_2O$,
20 g./l. of a 10% aqueous dispersion of the brightener described in Example 1.1,
1 g./l. of the brightener of the formula

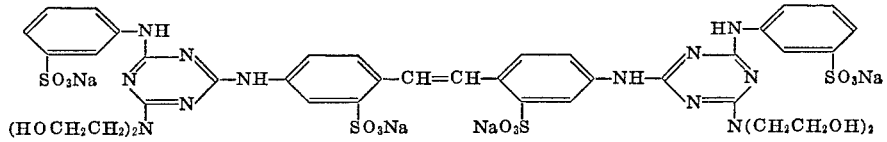

This solution is made up to 1000 ml. with water. A cotton/polyester mixed fabric is padded with this solution (squeezing effect 50–60%), preliminary dried at 100° and subsequently condensed for 5 minutes at 140°. The fabric is afterwards washed with a soda-alkaline washing solution. The thus treated fabric has a brilliant white appearance.

EXAMPLE 23

To 100 ml. of water are added 0.2 ml. of sulphosuccinic acid dioctyl ester. In addition, a 10% sand milling is prepared of the v-triazole of Example 1.1 or 2.1, 3 g. of such a sand milling are added to the above described aqueous solution. With this solution is padded at 20° a polyester fabric (roller pressure 30 kg./cm.², speed 3 m./min.). The still moist fabric is steamed for 30 minutes at 2 atm. The thus treated fabric has a white, brilliant appearance.

If instead of polyester fabric, a polyester/cotton mixed fabric is used, and a sodium chlorite bleaching subsequently carried out, then a brilliantly brightened fabric is obtained.

EXAMPLE 24

To 285 ml. of water are added 0.3 g. of octadecyl alcohol pentadecyl-glycol ether, as well as 0.15 ml. of trichlorobenzene as carrier, and a solution of 0.015 g. of the v-triazole described in Example 1.1 in 15 ml. of ethylene glycol monoethyl ether is added. This aqueous liquor containing the brightener is heated to 20–30° and 15 g. of a polyester fabric are introduced. The temperature is raised within 30 minutes to 130° and the bath is allowed to stand for 1 hour at this temperature. It is then cooled within 15–20 minutes to 60°. The fabric is rinsed and dried. The thus treated fabric possesses a white, brilliant appearance.

EXAMPLE 25

20 g. of a detergent of the composition described in Example 11 are mixed dry with 20 mg. of the v-triazole described in Example 3.1, and 15 mg. of the brightener of the formula

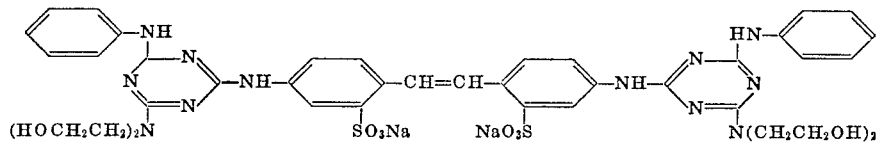

To this mixture are added 20 ml. of water and stirring continues until a homogeneous paste is obtained. This paste is dried in a vacuum drying cupboard. The dried paste is subsequently pulverised. In an amount of 1–5 g./l., it can be used for the brightening of a cotton/polyester mixed fabric.

EXAMPLE 26

100 parts of polypropylene with 0.5 part of titanium dioxide and 0.05 part of the optical brightener according to Example 3.1 are homogenised at 200° in a kneading machine. At a temperature of 280–300° and under inert gas at 2–3 atm., the melt is spun, according to known methods, through spinning nozzles. The thus obtained polypropylene threads are distinguished by a high degree of whiteness.

EXAMPLE 27

1000 parts of a polyester granulate made from polyterephthalic acid ethylene glycol are intimately mixed with 0.25 part of the optical brightener as described in Example 2.1, and the mixture is then spun under nitrogen, from an extruder, at a temperature of 265–285°, in a known manner, through a spinning nozzle to form threads. The thus obtained polyester threads have a clearly whiter appearance than corresponding polyester threads produced without addition of this brightening agent.

Also the brighteners described in Examples 1.1, 3.1, 3.2, 3.3, 3.4 and 3.5 can be used with a high degree of success.

EXAMPLE 28

In a high-grade alloy steel autoclave provided with a stirrer, a gas-inlet tube, a vacuum arrangement, a descending condenser and a heating jacket, 388 g. of benzene-1,4-dicarboxylic acid dimethyl ester, 300 g. of 1,2-ethanediol and 0.4 g. of antimonous oxide are heated, whilst pure nitrogen is being blown through, to 200° external temperature, and held at this temperature for 3 hours, whereby methanol slowly distills off. With the exclusion of air, 0.4 g. of the optical brightener according to Example 2.1, dissolved in 40 g. of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly reduced to 0.2 torr, and the condensation completed during 3 hours under these conditions. Thorough stirring is maintained during these operations. The liquid condensation polymer is then extruded with nitrogen through the nozzle in the base. From the thus obtained polymers, monofilaments can be produced which have a brilliant white appearance.

It is also possible to use, with a good degree of success, the brighteners described in the Examples 1.1, 3.1, 3.3, 3.4 and 3.5.

What is claimed is:

1. A procens for the production of a chlorine-containing v-triazole compound of Formula I,

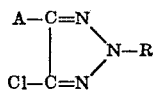

I wherein
A represents alkyl having 1 to 4 carbon atoms, benzyl, thienyl, naphthyl, biphenyl, phenyl or phenyl substituted by chlorine, methyl or methoxy, and
R represents a coumarinyl radical of the formula:

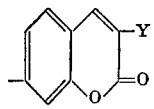

or a stilbyl radical of the formula:

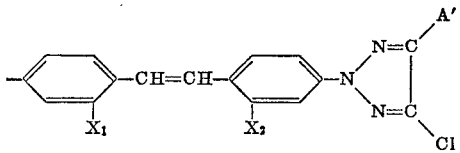

wherein
Y is phenyl or phenyl substituted by chlorine, methyl or methoxy, $X_1$ and $X_2$ independently are a sulfo ester radical having 6 to 8 carbon atoms or sulfonic acid radical and A′ independently of the A in Formula I has that meaning hereinbefore defined, characterised in that a v-triazole oxide of Formula II,

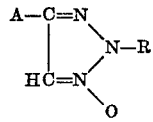

II is firstly reacted with sulphuryl chloride to the corresponding triazole oxide compound containing chlorine in the 5-position, and this is then reduced with nascent hydrogen to a compound of Formula I.

2. The process of claim 1 wherein said reaction is at a temperature of 80–90° C.

References Cited

UNITED STATES PATENTS 3,459,744   8/1969   Dorlars et al. ____ 260—340 CA

OTHER REFERENCES

Elderfield, Heterocyclic Compounds, vol. 7, frontispage and pages 412–413, John Wiley and Sons, New York (1961).

JOHN D. RANDOLPH, Primary Examiner

U.S. Cl. X.R.

106—176; 117—33.5 T; 252—110, 301.2 W, 543; 260—37 NP, 45.75, 75 R, 93.7, 141, 307 G, 208 A, 566 A